3,038,813
PROCESS FOR MANUFACTURE OF RAPIDLY REHYDRATABLE DEHYDRATED FRUITS AND VEGETABLES
James Cording, Jr., Philadelphia, and Roderick K. Eskew, Glenside, Pa., assignors to the United States of America as represented by the Secretary of Agriculture
No Drawing. Filed Aug. 5, 1960, Ser. No. 47,881
14 Claims. (Cl. 99—207)
(Granted under Title 35, U.S. Code (1952), sec. 266)

A non-exclusive, irrevocable, royalty-free license in the invention herein described, throughout the world for all purposes of the United States Government, with the power to grant sublicenses for such purpose, is hereby granted to the Government of the United States of America.

This invention relates to the preparation of dehydrated fruit and vegetable products in piece form capable of rapid reconstitution to a cooked edible state.

Products designed for this use now on the market consist of for example, thin slices of raw dehydrated potatoes to be used in preparing au gratin, scalloped or hash brown potatoes, potato salad and other forms where the identity of the piece must be retained. While these products are convenience foods in the sense that peeling, trimming and slicing have been done they are nevertheless not instant because they require from 15 to 30 minutes boiling in order to rehydrate and cook them sufficiently for use. Dehydrated diced potatoes, carrots and other vegetables are used commercially in the preparation of soups and stews. These porducts suffer the same disadvantages of slow rehydration as previously mentioned for the potato slices.

Similarly, dehydrated fruits are notably slow to rehydrate, frequently requiring long soaking prior to cooking and are therefore not convenience foods.

We have discovered a process for the preparation of fruit and vegetable pieces for both domestic and commercial use capable of rapid rehydration to a product ready for immediate consumption. A further advantage of the process is that if the product is to be stabilized by dehydration it enables a great reduction in the overall time required for dehydration. In drying conventionally prepared vegetable pieces the drying rate decreases markedly during the latter stages of drying. In the inventive process the physical form of the pieces is such that the drying rate during the latter stages of drying may be almost twice as fast as in the conventional process. For this reason the inventive process makes feasible the preparation of larger dehydrated pieces.

The present processes for manufacturing dehydrated vegetable pieces result in products that are shrunken, deformed and case hardened. Furthermore on rehydration these pieces rarely assume the shape or volume of the fresh vegetable piece. In contrast dehydrated vegetable pieces prepared by our process regain the approximate shape and dimensions of the original piece on rehydration.

In the inventive process foods such as vegetables and fruits whole or reduced to pieces of convenient size, are dried by any conventional means to a moisture content of between about 20 to 50% and are then heated at pressures between about 60 to 20 p.s.i.g. so as to superheat their contained water with respect to atmospheric pressure. The pressure is instantly released to the pressure of the atmosphere, thereby flashing from liquid to vapor a portion of the superheated water, thus creating a partially dehydrated fruit or vegetable piece having porous structure and capable of rapid reconstitution to edible form.

In an embodiment of the process raw vegetables are peeled and cut into pieces of the desired size and shape. They are then either steam or water blanched in the conventional way or are precooked as described in United States Patent No. 2,787,553 with or without an additional cooling step as described in United States application Serial No. 790,983. Whether blanched or precooked and cooled, the pieces may be sprayed with a solution of calcium chloride and sodium bisulfite to minimize sloughing on reconstitution and to improve keeping properties. This is important, for example, with high solids potatoes and with apple slices. The pieces are then partially dehydrated by any conventional method as for example in belt or tunnel driers. Moisture content at the end of this stage of drying should be about 20 to 50%. The partially dehydrated pieces are then placed in a chamber and sealed. The pressure within the sealed chamber is then brought rapidly to about 20 to 60 pounds per square inch gauge by the application of external heat. In general, higher pressures are used with the lower moistures. In the preferred method the chamber is rotated and heat is applied with a gas flame. Alternatively, heat may be applied by other means, as for example with steam in a jacket, in which case rotation might not be necessary. Upon reaching the desired pressure the chamber is opened instantly to the atmosphere, releasing the pressure and discharging the still intact pieces. The pressure-cooking effect combined with the flashing from liquid to vapor of a portion of superheated water from all parts of the piece forms a porous structure. The pieces may then be subjected to further drying to a moisture content appropriate for storage, for example, about 4% for cabbage and about 7% for potatoes. This can be done by any conventional means. The time required for this normally slow stage of drying is greatly reduced because of the porosity of the piece. Alternatively, the porous pieces, instead of being finally dried, may be frozen for storage and use. The finished product retains the general shape of the raw piece and does not exhibit the case hardening found in the conventionally prepared dehydrated products. On immersion in boiling water dehydrated vegetable pieces rapidly imbibe water, swell to approximately their original size and are cooked ready for serving in about 5 minutes.

The following data (Table I) illustrate some of the important relationships between moisture-content and chamber pressure. Obviously all combinations of pressure and moisture-content within these ranges are not satisfactory. For any given moisture-content there is comparatively narrow range of pressure which results in adequate porosity, preservation of integrity of the piece, and no scorching. This relationship will be different for different fruits and vegetables and for different varieties and will vary with pretreatment.

TABLE I

High Solids Russet Burbank; 3/8" x 3/8" x 3/8" Potato Dice

[Precooked and Cooled]

| Expt. No. | Moisture Content, Percent | Chamber Pressure, p.s.i.g. | Characteristics of Product |
|---|---|---|---|
| 1 | 22.72 | 40 | Insufficient porosity. |
| 2 | 22.72 | 60 | Insufficient porosity; scorched. |
| 3a | 34.0 | 30 | Not porous. |
| 3b | 34.0 | 40 | Insufficient porosity. |
| 3c | 34.0 | 50 | Satisfactory porosity; not schorched. |
| 3d | 34.0 | 60 | Some disintegration; slightly scorched. |
| 4 | 40.78 | 40 | Satisfactory porosity; not scorched. |
| 5a | 53.60 | 20 | Insufficient porosity; adhered to chamber. |
| 5b | 53.60 | 30 | Porous, slightly scorched; adhered to chamber. |
| 5c | 53.60 | 40 | Pieces disintegrated; adhered to chamber. |

Referring to Table I, on potato dice at 34.0% moisture-content, 30 and 40 pounds pressure in Experiments 3a and 3b were inadequate to produce a satisfactory porosity. On the other hand, 60 pounds pressure, in Experiment 3d, was too high, resulting in disintegration of the piece and some scorching. In Experiment 3c satisfactory porosity was achieved at 50 pounds without scorching or disintegration and the product after final drying rehydrated rapidly to a cooked edible state.

In Experiment 4, on potato dice of 40.78% moisture-content, satisfactory porosity was achieved at 40 pounds and the product was satisfactory.

Similarly using carrots diced to ⅜″ cubes and partially dried to 37.4% moisture-content, satisfactory porosity was achieved at 30 pounds (gauge) pressure in the chamber without disintegration or scorching, and the product after final drying rehydrated rapidly to a cooked edible state. At 20 pounds pressure, insufficient porosity was developed and at 40 pounds the product had a tendency to scorch. The carrot dice prepared at the preferred conditions (30 p.s.i.g.), rehydrated and were completely cooked, ready for eating after 5 minutes boiling. The same carrots, dried by conventional means, were not completely done in ½ hour, some pieces still being shrivelled in that time.

EXAMPLE I

Sebago variety potatoes of specific gravity 1.074, corresponding to a solids content of 18.6%, were peeled and cut into cubes ⅜″ on a side. The cubes were precooked in water at 160° F. for 15 minutes followed by cooling in water at 38° F. for 20 minutes. Then they were dipped in a water solution containing ½% by weight of sodium bisulfite and ½% by weight of citric acid followed by drying in trays by circulating heated air through the bed. The air was at 160° F. (dry bulb), and 100° F. (wet bulb) and the cubes were dried to 31% moisture. The partially dried cubes were placed in a sealed pressure chamber equipped with a hinged lid capable of instant opening. While rotating, the chamber was heated externally until the internal pressure reached 60 p.s.i.g. This required 9.6 minutes, whereupon rotation was stopped and the pressure instantly released by tripping the lid. The cubes were discharged from the chamber. They were then returned to the tray drier and dried under the same conditions as were employed in the first stage drying except that they were dried to a final moisture content of 6%.

The cubes, when placed in boiling water, rehydrated in 5 minutes to a uniformly cooked condition ready for eating and regained their cubical shape.

EXAMPLE II

Same as Example I except that instead of being precooked and cooled, the cubes were blanched in atmospheric steam for 6 minutes, and 55 p.s.i.g. was used instead of 60 p.s.i.g.

EXAMPLE III

Same as Example I except (1) that the potatoes were Idaho Russet variety of 1.083 specific gravity, and (2) that after precooking and cooling the cubes were sprayed with an aqueous solution containing 1.5% $CaCl_2 \cdot 2H_2O$ and sufficient sodium bisulfite to give approximately 300 p.p.m. of sulfite in the finally dehydrated cubes, and (3) that the partially dried cubes contained 34% moisture and (4) the pressure was 50 p.s.i.g.

EXAMPLE IV

Carrots were peeled and cut into cubes ⅜″ on a side. They were blanched in atmospheric steam for 6 minutes and were then dipped in a water solution containing ½% by weight of sodium bisulfite and ½% by weight of citric acid, followed by drying in trays by circulating heated air through the bed. The air was at 160° F. dry bulb and 100° F. wet bulb temperature. The cubes were dried to a moisture content of 37.4%. The partially dried cubes were placed in a sealed pressure chamber equipped with a hinged lid capable of instant opening. While rotating, the chamber was heated externally until the internal pressure reached 30 p.s.i.g. This required 6.2 minutes; whereupon rotation was stopped and the pressure was instantly released by tripping the lid. The cubes were discharged from the chamber. They were then returned to the tray drier and dried under the same conditions as were employed in the first stage except that they were dried to a final moisture content of 5%. The cubes, when placed in boiling water, rehydrated in 5 minutes to a uniformly cooked condition ready for eating and regained their cubical shape.

We claim:

1. The process for preparing a rapidly rehydratable food product comprising drying a member of the group consisting of fruit and vegetable pieces to a moisture content between about 20 to 50%, heating the piece at pressures between about 60 and 20 p.s.i.g., so as to superheat its contained water with respect to atmospheric pressure, and instantly releasing the pressure to that of the atmosphere thereby flashing from liquid to vapor a portion of the superheated water thus creating a partially dehydrated piece, having porous structure.

2. The process for preparing a rapidly rehydratable food product comprising drying a member of the group consisting of fruit and vegetable pieces to a moisture content between about 20 to 50%, heating the piece at pressures between about 60 and 20 p.s.i.g., so as to superheat its contained water with respect to atmospheric pressure, and instantly releasing the pressure to that of the atmosphere thereby flashing from liquid to vapor a portion of the superheated water thus creating a partially dehydrated piece, having porous structure, thereafter processing said piece to stable form.

3. The process of claim 2 wherein the processing to stable form comprises further drying.

4. The process of claim 2 wherein the processing to stable form comprises freezing.

5. The process for preparing a rapidly rehydratable food product comprising blanching a member of the group consisting of fruit and vegetable pieces to inactivate enzymes, drying to a moisture content between about 20 to 50%, heating the pieces at pressures between about 60 and 20 p.s.i.g. so as to superheat their contained water with respect to atmospheric pressure, and instantly releasing the pressure to that of the atmosphere thereby flashing from liquid to vapor a portion of the superheated water, thus creating partially dehydrated pieces having porous structure.

6. The process for preparing a rapidly rehydratable food product comprising blanching a member of the group consisting of fruit and vegetable pieces to inactivate enzymes, drying to a moisture content between about 20 to 50%, heating the pieces at pressures between about 60 and 20 p.s.i.g. so as to superheat their contained water with respect to atmospheric pressure, and instantly releasing the pressure to that of the atmosphere thereby flashing from liquid to vapor a portion of the superheated water, thus creating partially dehydrated pieces having porous structure, thereafter processing said pieces to stable form.

7. The process of claim 6 wherein the processing to stable form comprises further drying.

8. The process of claim 6 wherein the processing to stable form comprises freezing.

9. The process of claim 6 in which the vegetable is carrots.

10. The process of claim 6 in which the vegetable is potatoes.

11. The process of preparing rapidly rehydratable potato pieces comprising precooking the pieces at a temperature of about 140° F. to 180° F. for about 10 to 60 minutes, thereafter cooling them for at least about 14 minutes at a temperature below about 70° F., drying the pieces to a moisture content between about 20 and 50%, heating them at pressures between about 60 and 20 p.s.i.g. so as to superheat their contained water with respect to atmospheric pressure, and instantly releasing the pressure to that of the atmosphere, thereby flashing from liquid to vapor a portion of the superheated water, thus creating partially dehydrated potato pieces having porous structure.

12. The process of preparing rapidly rehydratable potato pieces comprising precooking the pieces at a temperature of about 140° F. to 180° F. for about 10 to 60 minutes, thereafter cooling them for at least about 14 minutes at a temperature below about 70° F., drying the pieces to a moisture content between about 20 and 50%, heating them at pressures between about 60 and 20 p.s.i.g. so as to superheat their contained water with respect to atmospheric pressure, and instantly releasing the pressure to that of the atmosphere thereby flashing from liquid to vapor a portion of the superheated water, thus creating partially dehydrated potato pieces having porous structure, thereafter processing said pieces to stable form.

13. The process of claim 12 wherein processing to stable form comprises drying.

14. The process of claim 12 wherein processing to stable form comprises freezing.

References Cited in the file of this patent

UNITED STATES PATENTS

| | | |
|---|---|---|
| 2,155,453 | Stuntz | Apr. 25, 1939 |
| 2,709,857 | Rivoche | June 7, 1955 |
| 2,752,253 | Talburt et al. | June 26, 1956 |
| 2,787,553 | Cording et al. | Apr. 2, 1957 |
| 2,905,594 | Morris | Sept. 22, 1959 |